March 16, 1954
O. A. WIENOLA
2,672,358
HIGH SPEED LOCKING DEVICE
Filed Aug. 3, 1950
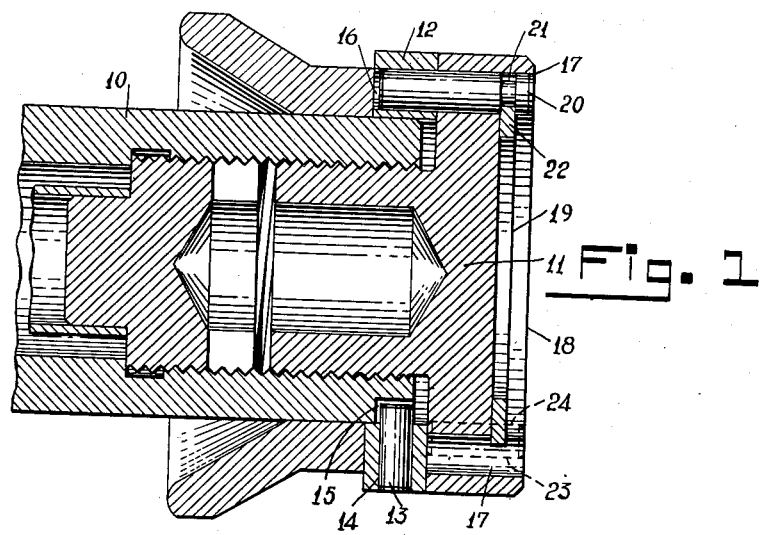
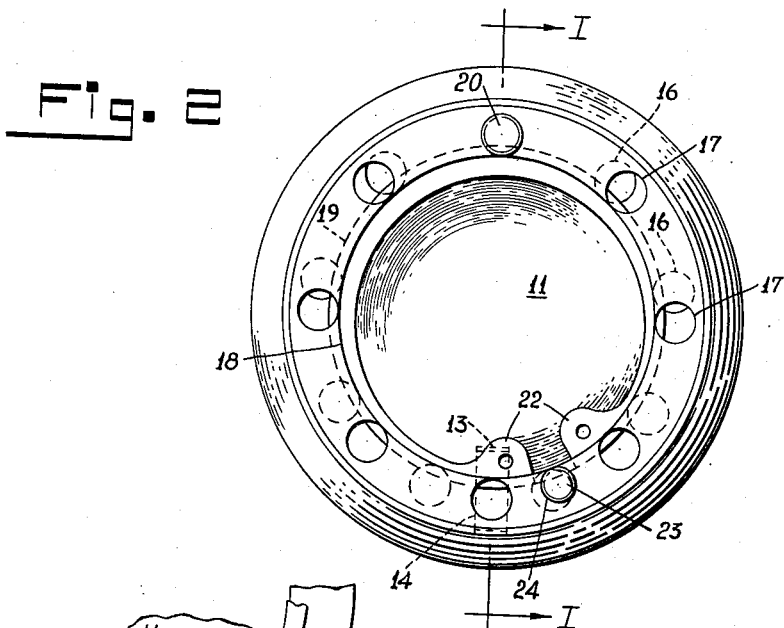
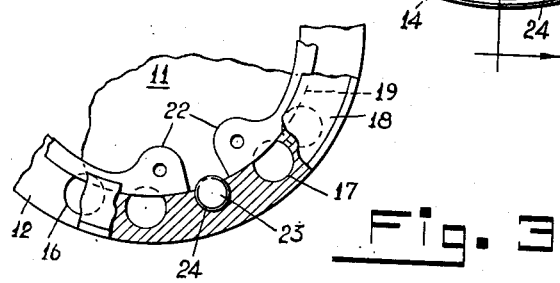
INVENTOR.
OIVA A. WIENOLA
BY Virgil F. Davico
Joseph Daleda
ATTORNEYS Patented Mar. 16, 1954

2,672,358

UNITED STATES PATENT OFFICE 2,672,358

HIGH SPEED LOCKING DEVICE

Oiva A. Wienola, Jackson Heights, N. Y., assignor to The M. W. Kellogg Company, Jersey City, N. J., a corporation of Delaware Application August 3, 1950, Serial No. 177,390

2 Claims. (Cl. 287—53)

This invention relates generally to the fastening of threaded members and particularly to the locking of a threaded member in or on a shaft rotating at high speeds.

An object of this invention is to improve and simplify the construction of a threaded member lock for high speed rotation which is easy and inexpensive to manufacture.

Another object is to provide a high speed threaded member locking device which can be adjustably tightened.

The overall object is to provide a threaded member locking device of simple, easily fabricated machine elements and which can be readily adjusted, locked and unlocked.

These and other objects of invention will be apparent from the following description of the invention and from an inspection of the drawings, of which;

Fig. 1 is a cross sectional view of the device taken along the line I—I of Fig. 2;

Fig. 2 is an elevation of the device as applied to a shaft rotating at high speed; and Fig. 3 is an expanded, partly sectional view of the locking action at the ends of the snap ring.

This invention, as specifically disclosed, is particularly applicable to a turbo-pump operating at high speed, but need not be necessarily limited thereto.

In the drawings, 10 indicates the end of a threaded shaft on which threaded member 11 is to be fastened. An internal thread arrangement is disclosed in which the threaded member 11 is in the form of an externally threaded hollow headed bolt but it is readily apparent that the invention is also applicable to an externally threaded shaft mounting an internally threaded nut. A lock washer 12 is keyed to the shaft by means of a pin 13 which is pressed into the washer through radial opening 14 in the washer circumference and projects into keyway 15 in the shaft. Lock washer 12 is provided with a number of equally spaced axial holes 16 which extend through the thickness of the washer. The threaded member 11 in turn is provided with similar equally spaced axial holes 17 but differing by one in number over those of the lock washer. As is well known, this difference in numbers permits a vernier adjustment of the nut and the lock washer. The holes 17 are the same size as holes 16 and are on the same pitch circle, and intersect a counterbore 18 on the outer face of threaded member 11, as well as snap ring groove 19, at the bottom of the counterbore.

When the threaded member has been screwed to its ultimate position against the lock washer, a lock pin 20 is inserted into the through holes 16 and 17 which match on the lock washer and threaded member. This lock pin 20 has an annular groove 21 adjacent an end for the reception of snap ring 22 and is positioned on the pin to insure positive locking of both lock washer and threaded member. Snap ring 22, which is almost circumferential, also fits into groove 19 at the bottom of counterbore 18 on threaded member 11, so that the snap ring holds the lock pin 20 in place while in position in groove 19.

The lock pin 20 which is inserted axially through holes 16 and 17 could fall out due to vibration were it not for snap ring 22 which resists such movement. Snap ring 22 cannot fall out due to its retention in the groove 19 and the effect of centrifugal action which tends to more tightly retain the snap ring in its groove. Consequently, the effect of high speed is to further increase the safety of this device.

To prevent the rotation of the snap ring to the position that the ends of the ring permit the lock pin to be disengaged, a dowel 23 is inserted into hole 24 on the outer face of threaded member 11 between the ends of the snap ring. This hole 24 does not pass through the threaded member 11 so that it can never match with any of the perforated holes 16.

Although many changes can be made by those skilled in the art of the disclosed apparatus without departing from the scope of the invention, it is intended that all matter contained in the above description and appended claims and shown in the accompanying drawings shall be interpreted as illustrative and not limitative.

What is claimed is:

1. In combination, a rotatable shaft having a threaded end, a lock washer mounted on said threaded end, means including a pin radially disposed relative to said shaft and said washer fastening said washer to said threaded end against rotation relative thereto, a threaded member carried by said threaded end and in threaded engagement therewith, said threaded member including a portion extending radially outwardly of said shaft and adapted to engage said washer, a circular series of similar longitudinal holes in each of said washer and said extending portion, a pin insertable through matching holes in said washer and said extending portion to lock said washer and said member against relative rotation, said pin including a transverse groove adjacent one end thereof, and means including a removable member positionable in said groove for locking said pin against longitudinal movement.

2. In combination, a rotatable shaft having a hollow internally threaded end portion, a lock washer on said shaft adjacent said end thereof, means including a radial pin in said washer fastening said washer to said shaft portion against rotation relative thereto, a hollow externally threaded bolt including an enlarged head portion and adapted to be screwed into said end portion to engage said head portion with said washer, a circular series of similar longitudinal hollows in each of said washer and said head portion, a pin insertable through matching holes in said washer and said head portion to lock said washer and said bolt against relative rotation, said head portion having a counterbore formed therein including an annular groove extending outwardly into said longitudinal holes in said head portion, said insertable pin having a circumferential groove formed adjacent one end thereof adapted to register with said annular groove, a split ring adapted to be positioned in said annular groove to engage the groove in said pin, and a cotter pin for insertion in a matching hole in said head portion to prevent said split ring from rotating.

OIVA A. WIENOLA.

References Cited in the file of this patent

UNITED STATES PATENTS

| Number | Name | Date |
|---|---|---|
| 281,055 | Greenhalgh | July 10, 1883 |
| 433,730 | Harker | Aug. 5, 1890 |
| 590,412 | Fleischman | Sept. 21, 1897 |
| 1,048,008 | Venner | Dec. 24, 1912 |
| 1,077,670 | Church | Nov. 4, 1913 |
| 2,332,684 | Armitage | Oct. 26, 1943 |
| 2,469,993 | Robson | May 10, 1949 |

FOREIGN PATENTS

| Number | Country | Date |
|---|---|---|
| 465,060 | Germany | Sept. 6, 1928 |
| 540,815 | Germany | Dec. 30, 1931 |
| 868,628 | France | Jan. 9, 1942 |

OTHER REFERENCES

Ser. No. 411,076, Jacob (A. P. C.), published May 11, 1943.